United States Patent [19]

Mosnier

[11] Patent Number: 4,661,135
[45] Date of Patent: Apr. 28, 1987

[54] BURNER FOR MANUFACTURING MINERAL FIBERS

[75] Inventor: Francis Mosnier, Coye La Foret, France

[73] Assignee: Isover Saint-Gobain, Courbevoie, France

[21] Appl. No.: 822,595

[22] Filed: Jan. 27, 1986

[30] Foreign Application Priority Data

Jan. 25, 1985 [FR] France ............................. 85 01042

[51] Int. Cl.$^4$ ..................... C03B 37/04; C03B 37/06
[52] U.S. Cl. ............................................. 65/14; 65/6; 431/158; 431/173
[58] Field of Search ..................... 431/158, 173; 65/6, 65/16, 14

[56] References Cited

U.S. PATENT DOCUMENTS

| 2,561,200 | 7/1951 | Hess | 431/158 |
| 3,084,381 | 4/1963 | Levecque et al. | 65/6 |
| 3,215,514 | 11/1965 | Levecque et al. | 65/6 |
| 3,233,990 | 2/1966 | Stephens et al. | 65/6 |
| 3,249,413 | 5/1966 | Simmers et al. | 431/158 X |
| 3,395,005 | 7/1968 | Stelmah | 65/14 |
| 4,478,624 | 10/1984 | Battigelli et al. | 65/14 X |

FOREIGN PATENT DOCUMENTS

| 1551686 | 5/1970 | Fed. Rep. of Germany | 431/158 |
| 970222 | 9/1964 | United Kingdom | 431/158 |

Primary Examiner—Robert Lindsay
Attorney, Agent, or Firm—Oblon, Fisher, Spivak, McClelland & Maier

[57] ABSTRACT

A technique of forming fibers, employing a drawing apparatus which apparatus is comprised of a centrifuge combined with a hot gas flow produced by a burner. The burner emits a continuous envelope along the centrifuge. This envelope is produced such that it flow out at the origin of a hyperboloidal configuration. This outflow is produced by feeding the burner from feed conduits which are inclined with respect to the axis of the burner.

5 Claims, 10 Drawing Figures

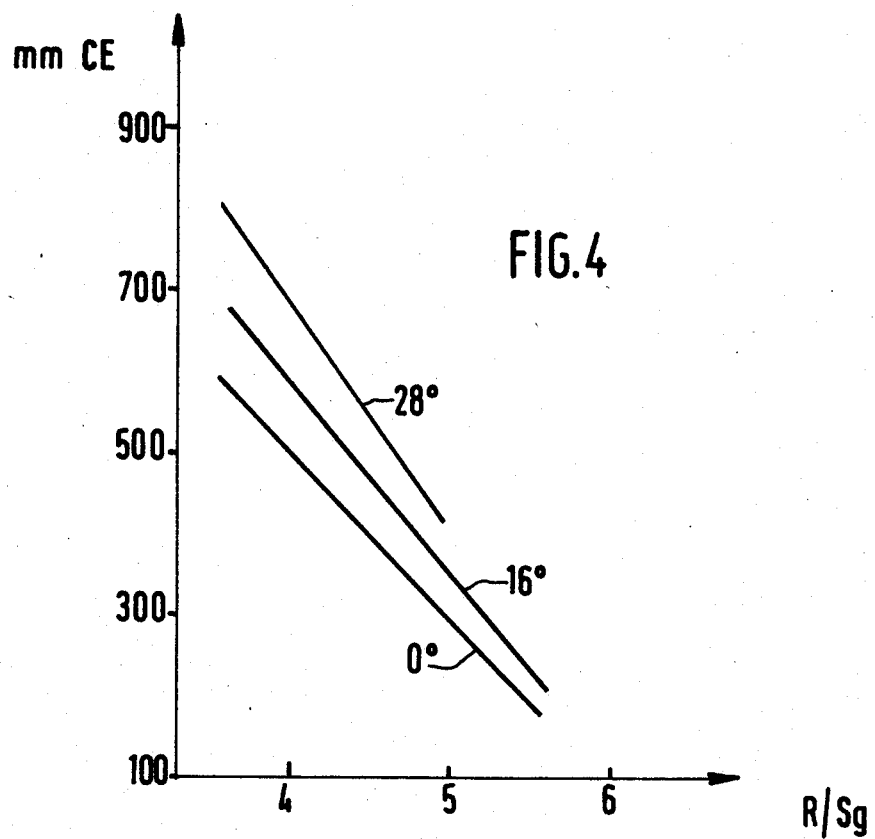
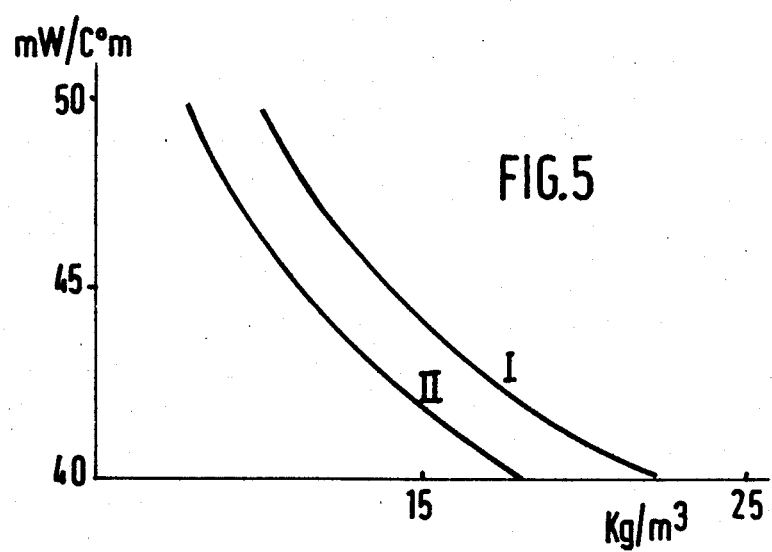

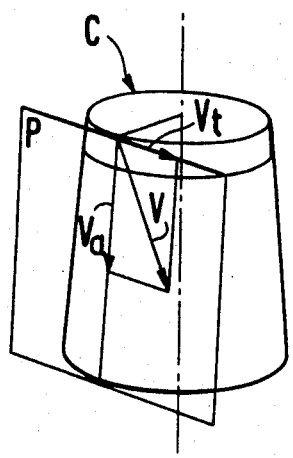
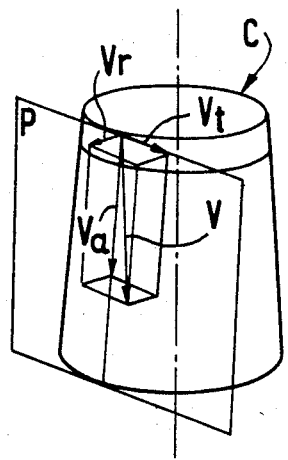
FIG.7a            FIG.7b
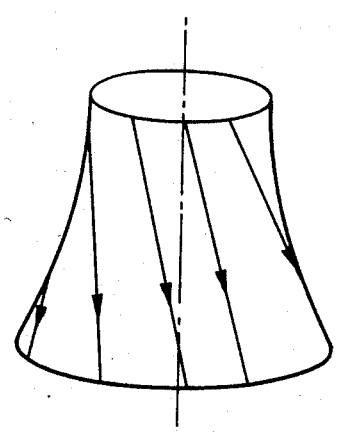
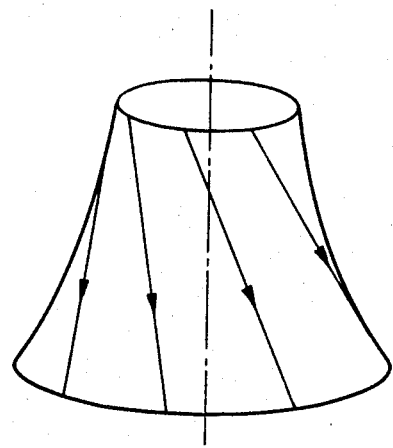
FIG.7c            FIG.7d

BURNER FOR MANUFACTURING MINERAL FIBERS

BACKGROUND OF THE INVENTION

1. Field of the Invention

The invention relates to improvements in techniques of manufacturing mineral fibers. More precisely, the invention relates to techniques in which the material of which the fibers are to be comprised is passed in the molten state into a hollow centrifuge having a large number of orifices at the periphery.

2. Background of the Prior Art

In techniques for the manufacture of mineral fibers, the material is expelled, under the action of centrifugal force, in the form of filaments which are passed into a gas flowing at high speed and at high temperature, with the said gas flow being along the peripheral wall of the centrifuge.

Such fiber production techniques are the subject of a very large number of publications. Among these one may cite Eur. Pat. Apps. Nos. 0 091 866 and 0 091 381.

It is seen from the prior literature, and particularly the above-cited two documents, that the qualities required for the fibers produced cover a wide range, depending on the intended uses of the fibers. Even among products not intended for use in acoustic or thermal insulation, there can be substantial differences.

The principal products of this type with regard to volume of production are felts known as "light felts" due to their low density. In order to achieve better thermal properties, these felts are advantageously comprised of very fine fibers (diameter <5 microns).

Light felts have very limited resistance to compression. For other purposes, therefore, one prefers an insulation comprised of fibers which are less fine but more resistant to compression.

The above is just one example of differences in properties of products which may be demanded by users. Obviously, the production conditions will vary depending on the type of product sought.

The manufacturing techniques of the fibers in accordance with these requirements must satisfy criteria of productivity and production cost. Regardless of the product being produced, it is necessary to achieve the highest possible level of production, using a given installation, and at lowest cost.

These different considerations make it desirable to have available production equipment which can operate under very diverse sets of conditions.

Thus, the technique described in Eur. No. 0 091 381 proposes means of production of fibers having a set of insulating and mechanical properties which responds to most usual requirements. The fibers are produced at a high rate and are of a fine gauge. Their length is such that their arrangement in the felt is quite isotropic in the plane of receipt, and such that the felt has the required mechanical properties.

One may assume in general, other things being equal, that the resistance and strength of the felt are greater the greater the fiber length. In order to obtain a homogeneous distribution of the fibers in the felt, however, it appears that they should be kept relatively short. However, these assumptions are not completely qeneral rules. The structure of the fibers themselves, and the fact that their individual characteristics are very similar, acts in a complex way to influence the insulating properties. Certain aspects of this will be discussed further, in connection with the applications of the invention.

Depending on the requirements, it is known to produce very fine, long fibers according to the techniques described in the above-cited documents. However, ordinarily in order to do this it is necessary to suffer a substantial reduction in the quantity produced by each installation.

It is also known to produce fine fibers at high production rates by, e.g., increasing the drawing effect by employing a hot gas flow. But ordinarily the fibers obtained are consequently shorter and less regular. Insulation produced in this way has a relatively high density. It is used, e.g., for panels (called "roof panels") which are applied to flat roofs and which support covers, which covers provide sealing.

It is therefore an object of the invention to provide means to enable diversity in the combinations of properties obtained by the techniques. In particular, the invention proposes to produce fibers which are fine and long, while maintaining high productivity of fibers on each installation, and without changing the chief characteristics of the centrifuge (number of orifices, dimensions of the centrifuge, etc.).

SUMMARY OF THE INVENTION

This and other objects of the invention are achieved by modifying the operation of the generator of the hot gas flow employed for the drawing of the fibers, such that the flow is emitted along the centrifuge itself and forms an envelope the shape of which— at least in the neighborhood of the point of emission— is a hyperboloid of revolution. Thus the direction of the emitted gas flow forms a certain angle with the axis of the centrifuge.

The peripheral wall of the centrifuge is either cylindrical or more frequently slightly conical. The gas flow thus makes a certain angle with the generatrix of the cylinder or cone.

The emission direction may be in the tangent plane to the peripheral wall of the centrifuge, which plane is parallel to or substantially parallel to the centrifuge axis. Alternatively, the emission may be at a limited angle to said plane.

In the first case, assuming the conicity of the centrifuge is negligible, the emission is at the neck of the hyperboloid; in the second case, the emission is located at a relatively slight distance above or below said neck.

If as a first approximation one assumes that the propagation direction of the flow in the tangent plane to the peripheral wall can be resolved into a component along the generatrix of contact (the "axial component") and a component perpendicular to this (the "tangential component").

In traditional techniques, the emission direction is approximately reduced to the axial component. According to the invention (departing from the traditional view), the tangential component is relatively important, even if its magnitude is substantially less than that of the axial component.

Of course, the initial direction of the flow changes as the flow progresses. These changes are due in particular to induction of ambient air and to phenomena resulting from such induction, e.g. lower pressure under the centrifuge.

However, in the zone in proximity to the centrifuge, namely the zone in which all the forces tending to draw

BRIEF DESCRIPTION OF THE DRAWINGS

FIG. 4 is a plot of pressure vs. the fineness of the fibers produced, for different types of burners;

FIG. 5 is a diagram showing the improvement in the insulating properties of products produced according to the invention;

FIG. 6 is a diagram showing the mechanical resistance of products according to the invention and that of products produced under traditional conditions and FIGS. 7a–7d illustrate the geometric conditions relating to the emission direction of the gas flow in carrying out the invention.

DETAILED DESCRIPTION OF THE INVENTION

Figure 1:
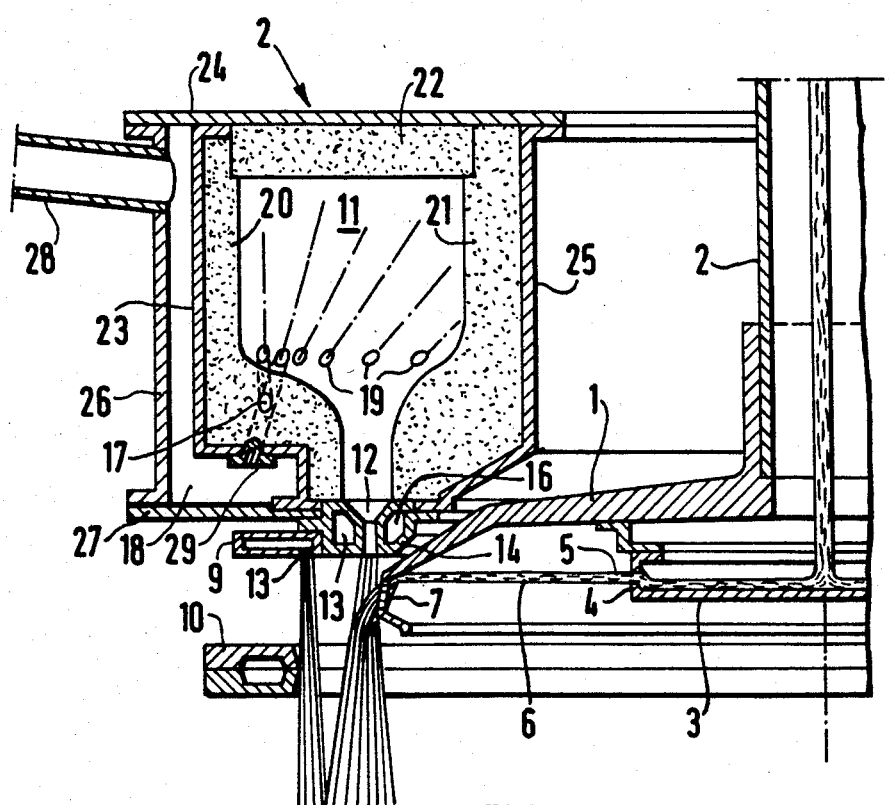
FIG. 1 is a partial cross sectional view of an apparatus for forming fibers according to the invention.

Under prior practice, the generator of the gas flow is advantageously of the type described in the Fr. Pat. App. published under No. 2,524,610. It is a generator comprising an internal combustion burner with a structure which affords a number of advantages. For example, this type of burner is easy to use. Its operation is stable over a broad range of regimes. It enables the emission to be maintained with great uniformity around the entire centrifuge. It also enables a gas flow to be produced which has high speed and high temperature, yet it occupies a small space. The burner must be disposed around the centrifuge, in a relatively confined space.

In this type of burner, the combustion takes place in an annular chamber which is not divided into compartments. The combustion (exhaust) gas escapes through a continuous orifice the width of which is intentionally narrow (on the order of 12 mm) to produce a high speed flow.

The manner of circulation and combustion of the gas inside the burner is particularly important for the operation. In practice, an attempt is made to provide that the combustible gas mixture is admitted in such a way that it circulates in a direction opposite to that of the combustion gas. This circulation is established without separation of these two gas flows, which thus are in contact with one another. Further the combustible gas mixture is introduced along a wall which is brought to an elevated temperature so as to increase the speed of ignition of said mixture. The elevated temperature of this wall results to a substantial extent from the radiation coming from the wall facing it, which opposite wall is in direct contact with the combustion gas.

It is also known, particularly from U.S. Pat. No. 3,215,514, to employ a generator which produces a gas flow directed tangentially to the centrifuge in a direction which is inclined with respect to the axis of said centrifuge. In U.S. Pat. No. 3,215,514, the flow generator emits a series of jets from distinct orifices the axes of which are directed in the directions in which the jets are desired to flow.

This disposition leads to a continuous gas flow at the periphery of the centrifuge. The orifices are preferably spaced closely together, such that the jets emitted quickly fuse. Nonetheless, in view of the very short distance separating the emission from the drawing zone of the fibers, this discontinuity does not enable the desired uniformity of treatment to be attained. With regard to the design of the device it should also be mentioned that emission from orifices of this type substantially limits the possible gas output available in a limited space, compared to that available with the burners described in Fr. Pat. App. No. 2,524,610. Thus, the treatment cannot attain the desired intensity.

In U.S. Pat No. 3,785,791 it is also proposed to employ a burner wherewith the combustion gases are emitted along the centrifuge with a tangential component. For this purpose in the burner having an annular shape, the flame is produced with a tangential direction in the interior of the combustion chamber.

According to the technique described in U.S. Pat. No. 3,785,791 the drawing by gas means is provided by two distinct means. At the immediate periphery of the centrifuge a low-speed flame enables the temperature to be controlled without substantial intervention in the drawing. This results from the action of gas jets disposed in a circle concentric with the centrifuge but outside the gas flow constituted by the "weak" flame.

In this prior patent, the particular functioning of the burner makes it unnecessary to have a very intense flame, contrary to the situation with burners of the type described in Fr. Pat. App. No. 2,524,610.

This also explains how the flame can be formed in a single point on the periphery of the burner without the resultinq lack of uniformity being to any apparent detriment. Basically, the temperature of the centrifuge is not very sensitive to local deviations in the neighboring atmosphere. Uniformity of the temperature over the entire circumference of the centrifuge is preserved by reason of the rapid rotation. The drawing of the filaments by the gas flows requires perfect homogeneity over the entire periphery. This is brought about in the said patent by the very regular disposition of the outlet orifices of the drawing jets. Also, to the extent that a certain uniformity of blowing conditions of the hot flows is sought to be achieved in that document, it is sought by means of a substantial increase in the trajectory of the combustion gas in the burner before reaching the exit orifice. This increase in the length of the trajectory is only possible because the gas flows emitted do not need to be extremely intense. It should also be mentioned that the increase in the length of this trajectory for the purpose of increasing the uniformity of the emission of combustion gas at the periphery of the centrifuge appears to lead to a substantial suppression of the "tangential" characteristic of the initial outflow, so that in order to reestablish this characteristic the said patent provides for the use of directional vanes disposed in the emission orifice. Again, such a disposition is only possible, particularly in the absence of means of cooling of said vanes, because of the low speed of the emitted gas.

Analyses of these prior documents shows that they do not offer a satisfactory means for the techniques according to the invention which comprise the use of gas flows providing highly uniform, energetic drawing, with a direction comprising tangential component.

These documents also do not enable one to envisage modification of burners of the type of those disclosed in Fr. Pat. App. No. 2,524,610, in that the presence of a series of distinct orifices emitting jets at the outlet of the burners and the presence of directional vanes in a continuous orifice are both excluded if one is to have satisfactory functioning of this type of burner.

The research leading to the present invention showed that it would be possible to devise burners of the inverted flow type which function under conditions of speed and temperature which prevail in the prior art wherewith the novel burners would in addition enable gas flows to be emitted in a direction having a tangential component.

In the prior Fr. Pat. App. No. 2,524,610, the burner described comprises a plurality of admission conduits for combustible gases, disposed over the entire periphery of the annular combustion chamber. These conduits are oriented with respect to the principal axis of the burner.

According to the invention, in order to produce a flow with a tangential component the admission conduits are inclined with respect to this same direction.

It has been found with this disposition that the gas exiting through the continuous orifice has a tangential component without any need to employ vane or the like at the exit of the burner in order to impose direction on the flow.

The tangential component imparted according to the disposition according to the invention is essentially controllable by the choice of the inclination of the admission conduits with respect to the axis of the burner. In general, this tangential component is greater the greater the inclination.

In practice, the inclination of the admission conduits is limited by the geometry of the device and the necessity to distribute the admission over a large number of orifices in order to obtain the uniformity of functioning sought over the entire burner. This inclination ordinarily does not exceed 75°, or preferably 60°. At the same time, if the inclination becomes too low, the effect produced is not very substantial; accordingly, in practice, the inclination is not less than 30°.

As will be seen, the direction of emission also depends on the geometry of the emission opening.

This opening as illustrated has the shape of an annular cylindrical orifice; however, it is also possible for it to have a certain conicity.

The emission will occur at the neck of the hyperboloid or at a position close to said neck, in difference cases.

In addition to being influenced by the system geometry, the emission direction may also be influenced by the regime of the burner. Thus it has been found that an increase in the temperature of the gas emitted from the burner causes a reduction in the tangential component; and conversely. In practice, however, the conditions under which the drawing of the fibers is carried out are limited relatively tightly with regard to temperature. Accordingly, modifications corresponding to variations in the regime are very limited.

It should be reiterated that in practice the most frequent direction of inclination of the gas flow is in the direction of rotation of the centrifuge, i.e., the tangential component of the direction of inclination is in the same direction as the movement of the centrifuge. As will be discussed, this disposition favors lengthening of the fiber products.

The invention will now be described in more detail with reference to the drawings.

The apparatus illustrated in FIG. 1 combines various elements employed in production techniques for fibers, employing centrifuging and employing drawing by means of hot gas, such as are claimed in Eur. Pat. Apps. No. 0 091 866 and 0 091 389. The apparatus comprised of a centrifuge 1 fixed on a shaft 2. The shaft and the centrifuge are driven in fast rotation by a motor (not shown). As is customary, the shaft 2 is hollow, and the material being used to form the fibers flows from feed means (a furnace, a fore-hearth, and tap) into the shaft 2, and onward to a basin 3. The drawable material spreads out over the bottom of the basin, which basin is also caused to rotate, such that the material is forced against the peripheral wall 4 which is perforated by orifices 5, and from there, in the form of large streams, against the peripheral wall 7 of the centrifuge 1. This peripheral wall 7 is perforated by a large number of orifices through which the material passes to form so-called "primary filaments" which filaments are relatively fine. These filaments are pushed out of the centrifuge and into the gas flow coming from the burner 8. Under the action of this flow, the primary filaments are drawn and become the fibers.

The apparatus illustrated in FIG. 1 also comprises a ring-shaped blow head 9 which produces a gaseous envelope which surrounds the gas flow emitted by the burner 8. This envelope enables better control of the progression of the flow emitted by the burner, in that it delimits said flow and prevents it from contacting neighboring static elements such as the induction ring 10. The said gaseous envelope also protects the gas flow of the burner from the surrounding air, in particular from slowing (drag) effects of induction of said air.

The induction ring 10 is employed in the apparatus illustrated to heat the part of the centrifuge which is most exposed to cooling by contact with the ambient air. It is very desirable for the peripheral wall to have a highly uniform temperature over its entire height, in order to maintain identical conditions for forming the filaments regardless of the positions, on said wall 7, of the orifices from which the filaments are forced.

The dispositions described supra are those most frequently employed. Obviously none of them is absolutely necessary as such, and there are numerous possible variations within the scope of the invention. Common to all such variations is a centrifuge 1 with its wall perforated by orifices, and an annular burner 8 which delivers a flow of hot gas at high speed along the peripheral wall 7.

In the embodiment shown schematically in FIG. 1, the annular burner 8 is comprised of a combustion chamber 11 bounded by walls comprised of refractory material. This chamber communicates with the exterior via a pressure reduction opening 12 which extends over the entire periphery of the burner. The pressure reduction opening 12 is extended by elements 13 and 14 which are comprised of refractory steel and serve to channel and direct the combustion (exhaust) gas over the periphery of the centrifuge. These elements 13 and 14 thus form a continuous slot of constant width. In order to prevent their being deformed, elements 13 and 14 are cooled by water circulating in their cavities 15 and 16. The means of feeding and removing the water are not illustrated.

The burner is fed with a combustible mixture of gases, by means of intake conduits 17. These conduits are disposed at regular intervals around the entire chamber. In order to promote uniformity of the feed conditions, all the conduits 17 communicate with one single annular feed compartment 18.

Each feed conduit 17 opens out into the combustion chamber 11 via an opening 19 along a refractory wall 20. The combustion chamber 11 is configured such that the combustion (exhaust) gas, before being emitted, passes along a wall 21 which faces wall 20. The combustible mixture is admitted into chamber 11 countercurrent to the evacuation of the burned gases, in order to facilitate heat exchange and thereby to facilitate ignition of the mixture. This ignition is also facilitated by the fact that the wall 21 in contact with the hottest gas radiates intensely toward the wall 20 facing it, thereby increasing the temperature.

The feed conduits 17 are inclined with respect to the main axis of the device, as described. As an indication of this, the directions of the axes of these conduits are shown with dot-dashed lines.

Figure 2:
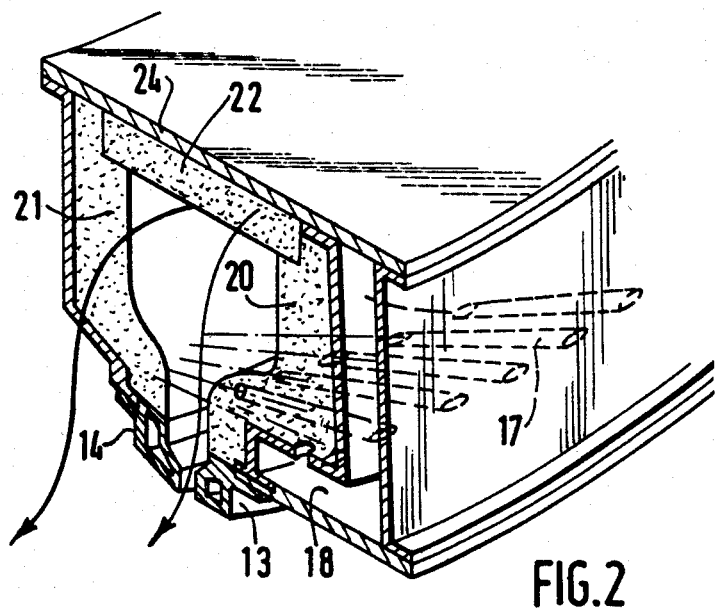
FIG. 2 is a perspective view of part of the burner of FIG. 1.

FIG. 2 shows schematically, via the arrows, the path of the gas in the combustion chamber. The initial inclination of the admission with respect to the axis of the burner influences the entire trajectory, and is reflected in the direction of the gas emitted. It goes without saying that the combustion in the combustion chamber cause substantial increases in temperature and speed.

Calculations show (and experience confirms) that the tangential component of the velocity of the gas is basically conserved when the total speed increases. Tn deciding upon the inclination of the feed conduits 17 it is necessary to have a much greater angle than that which the flow direction of the gas exiting the burner makes with the axis of the apparatus. Examples in this regard will be discussed. In practice, the conduits are generally inclined at a substantial angle.

It is necessary, for this type of burner, to keep the combustion inside the chamber 11. If the flame develops even partially outside said chamber, the burner loses part of its effectiveness.

To a certain extent, the fact that the initial direction of the gas in the combustion chamber is inclined causes the flow path of the gas in said chamber to be lengthened. The result is a tendency for more complete combustion. Consequently, the use of inclined injection enables the heat load of the burner to be increased.

Tests have been carried out under the conditions according to the invention and under customary conditions. Comparison of the results indicates new operating possibilities offered according to the invention.

In the tests mentioned, the centrifuge device was of the type illustrated in FIG. 1. The diameter of the centrifuge was 60 mm and the peripheral speed was about 60 m/sec. The burner was fed with a mixture of air and Groningue natural gas. The air-gas mixture was regulated so that the emission temperature at the exit from the burner would be 1550° C.

The injection was carried out at a series of 48 orifices regularly disposed, which orifices had diameter 16 mm. For the customary device, the orifices 17 were directed parallel to the axis of the burner. In the embodiment according to the invention, the orifices 17 were inclined. The tests reported below correspond to respective inclinations chosen such that, for the same operating conditions, the gas exiting the burner would be at an angle of about 16° and about 22°, respectively, to the axis of the burner.

In the burner bringing about an angle of 16° the exiting gas flow, the feed conduits 17 were inclined at an angle of slightly greater tan 50°; and for the burner in which the gas exited at an angle of 22°, the conduits were inclined at about 68°.

Advantageously the burner is fabricated by molding refractory cement over a matrix, followed by destruction of the matrix. As indicated in Fr. pat. App. 2,524,610, the matrix may be comprised of, e.g., expanded polystyrene. In this case the matrix may be destroyed by dissolution in a solvent.

To fabricate the conduits, the matrix may contain more rigid tubes, e.g. of polyvinyl chloride material. It is also possible to form the conduits by drilling, after the refractory wall has been produced.

As indicated in FIG. 1, it is preferable, for convenience of manufacturing, for the combustion chamber to be comprised of an assembly of a plurality of refractory pieces. In the embodiment shown, the said chamber comprises three parts corresponding to faces 20, 21, and 22, respectively.

The refractory walls of the combustion chamber are advantageously held in place by a metal skin comprised of a plurality of elements (23, 24, 25) assembled in customary fashion (by means not illustrated).

An assembly of metal walls (26, 27) advantageously comprises a peripheral cavity in which the combustible mixture circulates and is heated prior to entering the combustion chamber.

The feed of the combustible mixture is regulated upstream of the burner by changing the pressure with the aid of customary means (not shown). The gas mixture is passed to the peripheral cavity by means of one or more main pipes 28.

Advantageously, the ends of the feed conduits 17, disposed at the borders of compartment 18, are provided with a collar 29, the internal section of which collar may be designed so as to act as a diaphragm conduit.

In all the comparative tests carried out, the products of the same gauge were prepared according to the customary method with the burner blowing parallel to the axis, and subsequently according to the method according to the invention employing a burner which imposes a tangential component.

In lieu of conducting a complete study of the structures of the individual fibers, it was decided to compare felts of the same gauge, because the properties of such correspond to properties, particularly insulating properties, which would be similar if the fibers were the same between the two tests. Thus, any variations are manifestations of modifications in the structure of the fibers.

The gauges were measured according to the standard ASTM-D-1148-78. According to this standard, a given weight of entangled fibers (2, 2.5, . . . , 3.5, 6 g) was disposed in a compartment through which a gas flow under given pressure was passed. The resistance to the passage of the gas flow, measured by flow of circulating gas, is the measure of the gauge. This measure is smaller for finer fibers and for longer fibers, which provide greater resistance to the passage of the gas flow.

The simplest technique to change the gauge in a given direction is to change the pressure in the burner. Of course, this pressure depends on the pressure of the combustible gas mixture injected into the burner, and this pressure has a directly correlated effect on the speed of the gas emitted, wherewith the speed and pressure change in the same direction.

FIG. 4 is a diagram showing variations in dynamic pressure at the outlet of the burner (for the three burners mentioned above), expressed in mm of water, plotted versus the gauge of the fibers produced. It is seen that for all these cases, at a given fiber gauge the pressure is greater for a greater "tangential component" of the velocity of emission of the combustion gas.

In the two cases corresponding to the invention (emission at angles of 16° and 22°), the tangential component is in the direction of rotation of the centrifuge.

It may be assumed that if the pressure must be higher to yield the same gauge, this is due to the fact that the gas flow moves partly in the direction of rotation of the centrifuge, and that in order to maintain the action by which the gas is forced out it is necessary to have a higher overall speed of the gas and therefore a higher pressure. Consequently, the energy consumption is slightly greater in the case of the invention.

The advantages of employing the invention are principally in the properties of the fibers which are produced. These properties (mechanical and insulating) are particularly advantageous when the fibers are of very fine gauge. As stated supra, the production ofv Very fine guge fibers (with guge <3/5 g) is brought about principally by increasing the pressure in the burner.

Figure 3:
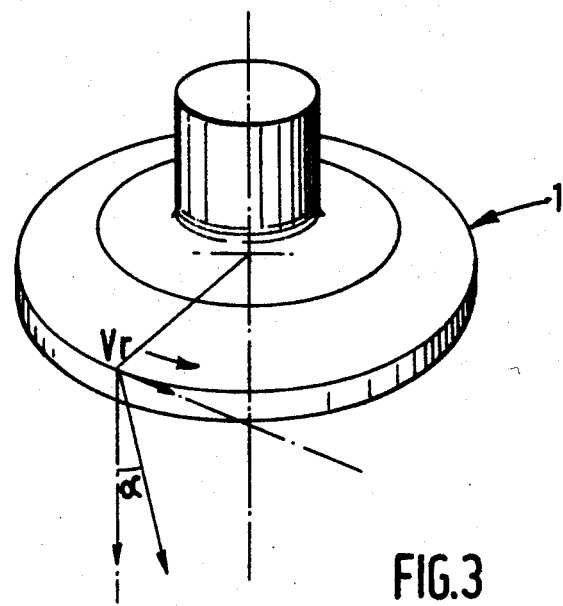
FIG. 3 illustrate schematically the preferred directions of the velocity components of the gas, with respect to the rotation of the centrifuge.

In the traditional configurations, it has been found that when pressure is increased excessively the result is fibers which are too short. When a flow is used with a tangential component in the direction of rotation of the centrifuge, as shown in FIG. 3, the fine fibers obtained are not "jarred" to as great an extent at the time they are formed, and consequently they are substantially longer.

Experimentally, the best results concerning the length of the fibers, when the invention is employed, ar obtained when the burner is operated such that the tangential component of the velocity of the gas emitted is substantially equal to the peripheral speed of the centrifuge.

There have not been systematic studies of the production of long fibers. For applications in which shorter fibers are preferred, either a customary burner is employed or, possibly, a burner according to the invention in which the tangential component of the emitted gas is in the direction opposite to the direction of rotation of the centrifuge. It has been found that in this case fibers are formed which are even shorter than those obtained by the customary method.

Also, in the case where a gas flow is used with tangential component in the direction opposite to the direction of rotation of the centrifuge, all other things being equal it is possible to reduce the pressure of the burner and thereby the energy consumption.

In the examples of employment of the invention, and with the velocity conditions indicated for the centrifuge, an attempt was made, in order to yield long fibers, to control the tangential speed at about 60 m/sec. For the two cases considered this was achieved with a total speed of emission of on the other of 210 m/sec.

According to the invention, the product is improved in its insulating properties, particularly for products of low density. FIG. 5 shows results of measurements of thermal conductivity plotted against density of fabricated felts.

In the two series of tests corresponding to the curves shown, the fibers had the same gauge, namely $F=2.5/5$ g. The material output rate was also the namely 14 tons per day per centrifuge. The burner according to the invention (curve II) formed a gas flow having a tangential component inclined at 16°. Curve I corresponds to a customary burner.

It is noted that all the other conditions were identical, and that the felt produced under the conditions of the invention performed better, as to thermal conductivity (lower thermal conductivity for a felt of the same density, or, equivalently, the same thermal conductivity at a lower density).

This improvement may be attributed to lengthening of the fibers, and to better homoqeneity of the arrangement of the fibers. In particular, statistical studies of the diameters of fibers produced according to the invention show very low dispersion. The histogram of the fiber diameters is very narrow, and does not have a unique maximum.

The increase in the length of the fibers also results in increased tensile strength of the insulating felts. It is known that a felt is stronger if the fibers of which it is comprised are longer. Basically, the mechanical cohesive strength is a function of the degree of entanglement of the fibers. The longer the fibers, the more numerous are the connections brought about at points of their contact.

Figure 6:
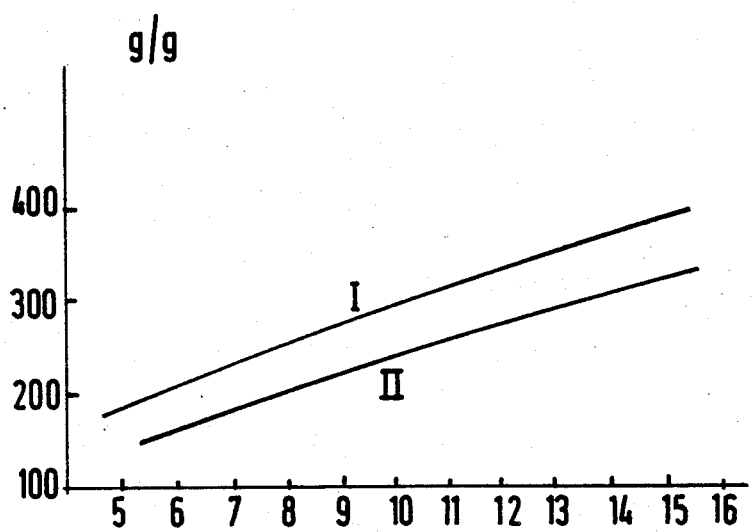

FIG. 6 shows results of measurements of tensile strength of felt samples produced under customary conditions and according to the invention.

In the tests represented, the output of the centrifuge has been held at 20 tons per day, which amounts to a high level of production— a level which ordinarily is not favorable to production of fibers having good performance. The gauge for these tests was controlled at $F=4/5$ g.

The burner according to the invention gave a tangential component of around 16°.

The measurements were carried out according to ASTM-C-681-76. For that standard, ring-shaped pieces cut from the felt were subjected to tension until they broke.

The plot of FIG. 6 was produced for different felt densities.

It is seen from this plot that felts fabricated according to the invention (curve I) have greater strength than those corresponding to customary conditions (curve II).

Other advantages result from employing the inventive conditions. In particular, the distribution of the fibers on the conveyor onto which they are received immediately after being produced is appreciably improved. This is due to an effect of the type described in Eur. Pat. App. No. 0 072 300.

It turns out that that the nap of fibers formed downstream of the centrifuge is substantially more expanded when the burner produces a gas flow with a tangential component.

The amount of increase of the nap of the fibers is such that it is possible to reduce or even eliminate the traditionally employed means for distributing the fibers over the entire width of the conveyor.

It is quite evident that the expansion of the nap of the fibers results from the modification introduced in the outflow of the gases. FIGS. 7a–7d illustrate schematically the outflow in the mode according to the invention.

FIGS. 7a and 7c represent the case in which the gas emission occurs in the position which we have designated the "neck of the hyperboloid". The direction V of the gas outflow is contained in the plane P tangent to the peripheral wall of the centrifuge C.

This direction V is decomposed into an "axial" direction Va and a tangential direction Vt. Most commonly the tangential direction is the same as the direction of rotation of the centrifuge.

The circulation of the gas, assuming as a first approximation that it is not perturbed by the phenomenoma of induction, approximates a hyperboloid such as illustrated in FIG. 7c. This flow is basically accompanied by a certain expansion of the nap, which expansion is appreciably greater than that resulting in traditional modes of emission without a tangential component.

The slight conicity of the centrifuge, which has been reproduced in the Figures, has practically no effect on the emission conditions. For this reason, in the case of FIGS. 7a and 7c, the emission can be made from an "annular cylindrical" opening such as illustrated in FIG. 1.

FIGS. 7b and 7d illustrate the case of an emission occuring below (downstream of) the neck of the hyperboloid formed by the gas outflow. It is worthwhile to mention that even in this case the emission is localized in the immediate proximity of the centrifuge C, to preserve all of its action on the gas flow.

In the case illustrated. the emission direction V is no longer contained in the plane P. It is decomposed, as previously, into an axial component Va, and a tangential component Vt to which there is added an additional component designated the radial component Vr. In the embodiment shown, this radial component is "centrifugal". This configuration corresponds to a greater expansion of the nap of the fiber in the drawing zone. In all cases, the radial component of the emission is relatively small with respect to the other components.

What is claimed as new and desired to be secured by Letters Patent of the United States is:

1. An internal combustion burner comprising an annular combustion chamber surrounding a mineral fiber forming centrifuge, said chamber opening through a pressure reduction opening, and further comprising elements which define a continuous circular emission orifice, with the direction of said orifice being generally parallel to the axis of the burner, wherewith a mixture of combustible gases is fed into the combustion chamber by feed conduits which open out into said chamber and which are directed such that the gas is fed along one wall of the combustion chamber and countercurrent to the movement of the combustion gases which pass along a wall which faces the first wall which first wall has the combustible gas mixture passing along it where said combustible said gas mixture is admitted, wherein the feed conduits are directed at an angle to the axis of the burner.

2. A burner according to claim 1, wherein the angle between the feed conduits and the axis of the burner is less than 75° and preferably less than 60°.

3. A burner according to claim 1, wherein the angle between the feed conduits and the axis of the burner is greater than 30°.

4. A burner according to claim 1, wherein the feed conduits are formed in a refractory wall of the combustion chamber.

5. A burner according to claim 8, wherein the feed conduits all communicate with an annular compartment which distributes the combustible mixture in uniform fashion over all the said conduits, and wherein the end of each of the feed conduits which opens out into the compartment is furnished with a collar which protects said end and which acts as a diaphragm for the conduit.

* * * * *